April 3, 1962   J. F. NICHOLAS ET AL   3,028,540
ELECTRIC POWER LEVEL DETECTOR AND REGULATOR
Filed Nov. 16, 1959

INVENTORS
JOHN F. NICHOLAS
DEAN S. WINCHESTER
BY

*Paul A. Critchlow*
ATTORNEYS

United States Patent Office 3,028,540
Patented Apr. 3, 1962

3,028,540
ELECTRIC POWER LEVEL DETECTOR AND
REGULATOR
John F. Nicholas, North Syracuse, and Dean S. Winchester, Baldwinsville, N.Y., assignors, by mesne assignments, to the United States of America as represented by the Secretary of the Navy
Filed Nov. 16, 1959, Ser. No. 853,431
6 Claims. (Cl. 323—66)

The present invention relates to electric power regulators and more particularly to an instrument for measuring the power deviation from a given output level and controlling the input power level by means of negative feedback principles characterized in accordance with predetermined regulation formulae to provide desired operating conditions.

The circuit constituting this invention has its basis of operation in the fact that if a given percentage change in D.C. load current is accompanied by a D.C. load voltage change of equal percentage but opposite in direction to the current change, the voltage-current product or D.C. power remains reasonably constant for a usable range of voltage and current level changes from the mean values. Structurally, it includes a means for simultaneously detecting the changes in voltage level and current level which occur during normal operating conditions and means responsive to said changes for electrically manipulating combined input factors to adjust said power output level to a predetermined value. Also, in event the deviation of said voltage and current levels from the mean values increases beyond the usable range in either direction, circuit means are provided which causes the power applied to the load to automatically decrease, thus providing protection therefor.

It is, therefore, a primary object of this invention to provide an electrical power detector and regulator which proportionally controls the current and voltage constituting the input factors to a given load requiring power regulation.

Another object of this invention is to provide an electronic power sensing and regulating circuit.

A further objective of this invention is to provide a power regulation circuit which functions according to predetermined operational characteristics that may be specifically and mathematically defined.

Another object of this invention is to provide a means for decreasing the power applied to a load for protection thereof when the voltage and current applied thereto deviates beyond a safe useful range in either direction.

Last but not least, it is an object of this invention to provide a power measuring and control instrument which is easily and economically constructed.

Other objects and many of the attendant advantages of this invention will be readily appreciated as the same becomes better understood by reference to the following detailed description when considered in conjunction with the accompanying drawings and wherein.

Figure 1:
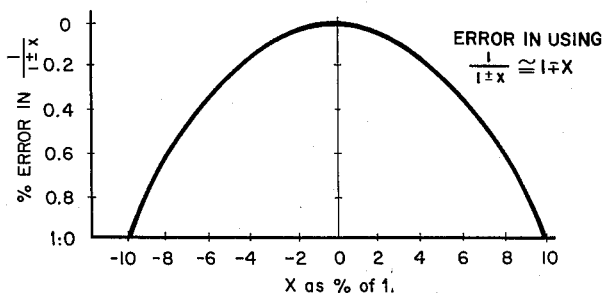
FIG. 1 is a curve showing the mathematically related functions and proportional errors which may be expected according to the instant mathematical analysis pertinent to the invention.

The fact mentioned above that the voltage-current product of D.C. power remains reasonably constant for a usable range of voltage and current level changes from the mean values if the percentage change in D.C. load current is accompanied by a D.C. load voltage change of equal percentage but opposite in direction to the current change may for all practical purposes be proven mathematically by means of the following equations:

Letting X=the fractional deviation in voltage or current; then (1) $$\frac{1}{1 \pm X} = 1 \mp X \pm X^2 \mp X^3 \pm X^4 \ldots$$

But if X is small enough, all but the first two terms in this series expansion may be discarded with negligible error. Then Equation 1 becomes (1A) $$\frac{1}{1 \pm X} \cong 1 \mp X$$

Referring now to the figures, the error in $$\frac{1}{1 \pm X}$$

is shown when Equation 1A is used. The error is expressed as a percentage of $$\frac{1}{1 \pm X}$$

and plotted against X expressed as a percentage of 1. If Equation 1A is changed to (1B) $$1 \cong (1 \pm X)(1 \mp X)$$

and the D.C. electric electric power is held constant so that the mean line in watts equals the product of the mean D.C. line volts and the mean D.C. current in amperes, then (1C) $$W_L = (V_L)(I_L)$$

where $W_L$ is the mean line power in watts, $V_L$ is mean line voltage, and $I_L$ is mean line current. Equation 1C may then be expressed (2) $$\text{Constant} = V_L \times I_L$$

Equation 1B may then be multiplied by Equation 2 giving (3) $$\text{Constant} = [V_L(1 \pm X)][I_L(1 \mp X)]$$

The power detector and regulator circuit of this invention satisfies Equation 3 by responding to the sum ($V_T$) of a fraction of the load voltage ($V_v$) and a voltage ($V_I$) which is proportional to the load current. Hence, (4) $$V_T = K_1 V_v + K_2 V_1$$

where the circuit is designed so that $K_1 V_v$ and $K_2 V_1$ are reasonably close to equality, which makes it equally sensitive to changes in load voltage and load current.

Figure 3:
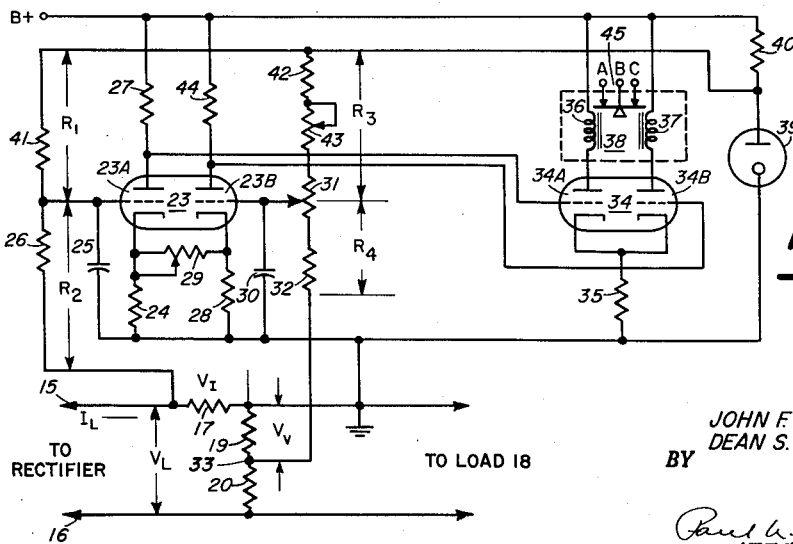
FIG. 3 is a schematic diagram of the electronic circuit constituting this invention.

The subject power detector and regulator circuit is used to operate an adjustment means of the servo type or otherwise to keep $V_T$ constant. Equation 4, therefore, becomes (4A) $$\text{Constant} \cong K_1 V_v (1 \pm X) + K_2 V_1 (1 \mp X)$$

when $$K_1 = \frac{R_3}{R_3 + R_4}$$

and $$K_2 = \frac{R_1}{R_1 + R_2}$$

of FIG. 3. By following Equation 4A, the power detector also satisfies Equation 3 and keeps the power level constant, inasmuch as equal and opposite percentage change in $V_v$ and $V_I$ are produced by equal and opposite percentage change in $V_L$ and $I_L$.

Figure 2:
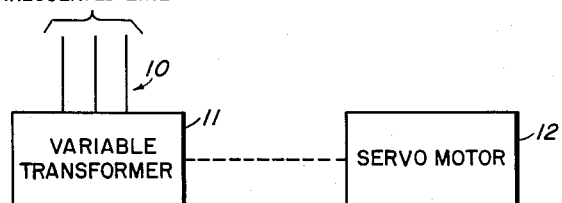
FIG. 2 is a representative system partially in box diagram form and partially in circuit form illustrating an example of how the subject invention may be practically employed.
Figure 2:
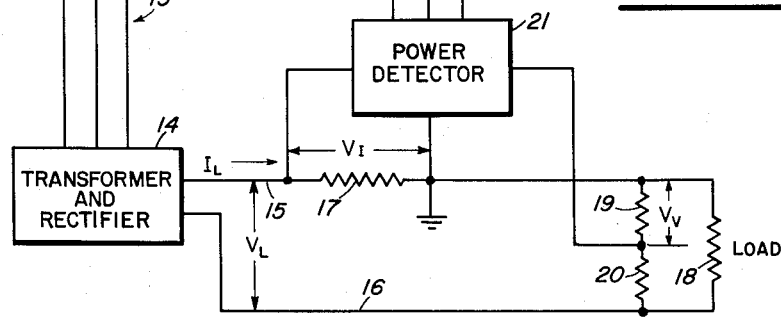

Considering now FIG. 2 in particular, there is depicted a three-phase unregulated A.C. line input 10 coupled to a variable transformer 11 for regulation thereof by a servo motor 12 connected thereto. A three-phase output 13 from said variable transformer is connected to a transformer and rectifier system 14 for appropriate impedance matching and rectification purposes.

The output of said transformer and rectifier system includes an electrical line 15 and an electrical line 16 across which the aforementioned mathematically employed $V_L$ is taken and through which the above mentioned mathematically employed $I_L$ is conveyed to a resistor 17 and then on to the load represented by a resistance 18. Connected in parallel with said load is a voltage divider network comprising series connected resistors 19 and 20. The interconnection of resistor 17, load 18, and resistor 19 is grounded. A power detector and regulator unit 21, shown in detail in FIG. 3 has its input connected across both resistor 17 and resistor 19 and an output 22 coupled to the aforesaid servo motor 12 for appropriate regulation thereof, which, in turn makes adjustments to variable transformer 11, controlling the A.C. line voltage.

Referring now to FIG. 3, the power level detector and regulator circuit is illustrated as comprising a balanced D.C. amplifier 23 which includes a first triode 23A having a cathode, a grid and a plate. The cathode of 23A is connected to ground at a point of intersection of resistors 17 and 19 and load 18 along the output line of transformer and rectifier system 14. The grid of triode 23A is connected to ground through a capacitor 25 to prevent response to transients and ripple in $V_I$, and is also connected to the input terminal of resistance 17 through a resistor 26. The plate of triode 23A is connected through a resistor 27 to a B plus voltage. The cathode of triode 23B is connected to ground through a resistor 28. The cathodes of triode 23A and triode 23B are interconnected by means of a variable resistor 29. The grid of triode 23B is coupled to ground through a condenser 30 to likewise prevent response to transients and ripple in $V_v$ and is also connected to the movable arm of a potentiometer 31 which has one terminal thereof connected through a resistor 32 to the point of interconnection between resistors 19 and 20 paralleling the load circuit. The plates of triodes 23A and 23B are respectively connected to the grids of a first triode 34A and a second triode 34B of a dual-triode power amplifier 34. The cathodes of said power amplifier 34 are connected to each other and to ground through a common cathode resistor 35. The plates of triodes 34A and 34B are coupled respectively through excitation coils 36 and 37 of relay 38 to B plus voltage. Connected between ground and B plus voltage is a series connected voltage regulator tube 39 and a resistor 40. The point of interconnection of said voltage regulator tube and resistor 40 is coupled to the grid of triode 23A through a resistor 41 and, in addition, is connected to the grid of triode 23B through a resistor 42, a variable resistor 43 and the other terminal of the aforementioned potentiometer 31. The plate of triode 23B is connected to B plus voltage through a plate resistor 44. Relay 38 includes electrical contacts A, B, and C of a set of contacts 45 which are appropriately connected to servo motor 12 for controlling same in accordance with the actuation of said contacts by said excitation coils.

The operation of the power level detector and regulator circuit of FIG. 3 is briefly as follows. Double triode 23 is a cathode-coupled, balanced D.C. amplifier; double triode 34 is an amplifier which converts the plate voltage of triode 23 to a power level sufficient to actuate relay 38; and tube 39 is a voltage regulator against which $V_v$ and $V_I$ are referenced. For normal operation, variable resistor 31 is adjusted so that the output voltage difference between the plate of triode 23A and the plate of triode 23B is zero when the power is at its mean level, and resistors 17 and 19 are chosen so that $V_I$ and $V_v$ are equal when the resistance of the load is at its mean value. Thus, it can be seen that an increase in $V_I$ due to an increased load current makes the grid of triode 23A more positive and an increase in $V_v$ due to an increase in load voltage makes the grid of triode 23B more negative which results in the unbalance in the output plate voltage of duo-triode 23. Since the unbalance in these plate voltages is in the same direction for a load current change as it is for a load voltage change, the subject circuit follows Equation 4A, mentioned above, and the power to the load remains substantially constant.

In addition to being chosen so that $V_I$ and $V_v$ are equal when the resistance of the load is at its mean value, resistors 17 and 19 are chosen so that $V_I$ and $V_v$ are small with respect to the reference voltage. Although many different ratios may be used without violating the spirit of this invention, it has been found that a reference voltage approximately thirty times as great as the $V_I$ and $V_v$ voltages provides satisfactory operation. The main advantages of having $V_I$ and $V_v$ small with respect to the reference voltage are that less power is wasted in producing $V_I$ and, also, that the grid dividers for triodes 23A and 23B have more nearly equal ratios. Having more nearly equal ratios mean that $K_1V_v$ more nearly equals $K_2V_I$, Equation 4A, is more nearly followed, and control performance is an optimum because the divider error is negligible. Potentiometer 31 and resistor 43 of the expression $K_1$, furthermore, are operative as an adjustment for tube inequalities and resistor tolerances and a fine adjustment of the power level, respectively.

After being amplified by power amplifier 34, the plate output voltage differential from dual-triode 23 unbalances relay 38 to close contacts A—B of said set of contacts 45 when the power is above the allowable level and closes contacts B—C of said set of contacts 45 when the power is below the allowable level. Relay 38 then appropriately actuates the aforementioned servo motor 12, which, in turn, causes the line voltage to be regulated until the power level is corrected.

Inasmuch as the subject invention utilizes a balancing relay circuit, compensation for major B+ and reference voltage variations is also effected, substantially eliminating the possibility of the output being erroneous. Thus, for example, if there is a variation in the reference voltage across regulator tube 39 due to a variation in B+ voltage, a substantially identical variation is applied to the grids of both tubes 23A and 23B. The signal to the grids of these tubes will be in phase and will have a relatively small amplitude difference compared to the average level of D.C. voltage across tube 39.

The overall sensitivity of this power detector and regulator is sufficient to regulate the power level to less than two percent error excluding uncanceled reference tube variations for a load resistance change of ten percent or more or a line voltage change of five percent or greater. For some types of operation it is possible to regulate the power within one percent error by increasing the gain of the detector and reducing the values of $V_v$ and $V_I$. However, in any event, the limitation in accuracy even with an infinite gain would ostensively be that illustrated in FIG. 1.

It may, therefore, be readily seen that this invention can function to regulate various and sundry items such as A.C. and D.C. power, tube filament power and temperature, and cathode emission. Or it may also be adapted by means of suitable transducers to control other quantities expressed as the product of two factors such as fluid flow where flow is equal to velocity times area, or such as photographic exposure under varying illumination where light intensity times aperture area equals exposure.

Obviously, many modifications, variations, and uses of the present invention are possible in the light of the above teachings. It is, therefore, to be understood that within the scope of the appended claims, the invention may be practiced otherwise than as specifically described.

What is claimed is:

1. In a system for detecting and regulating the electric power supplied to a load at a predetermined level, means connected in series with said load for extracting supply current samples and converting same into proportional voltage parameters, means connected in parallel with said load for extracting supply voltage sample signals, a first pair of balanced, cathode-coupled, direct current, triode amplifiers each of which has a cathode, a grid, and a plate, a voltage regulator means, first and second voltage divider networks effectively connected in parallel with said voltage regulator means and to the grids of said first pair of triode amplifiers respectively, means interconnecting one of the grids of said first pair of triode amplifiers and said supply current extracting means for applying said proportional voltage parameters to said one grid through a portion of said first voltage divider network, means interconnecting the other of the grids of said first pair of triode amplifiers and said supply voltage sample extracting means for applying said sample voltage signals to said other grid through a portion of said second voltage divider network, a second pair of triode amplifiers respectively connected to the plates of said first pair of balanced triode amplifiers for amplifying the outputs therefrom, relay means adapted to be coupled to an electric power supply regulator for appropriate adjustment thereof connected to the outputs of said second pair of triode amplifiers for response to the respective outputs therefrom, and means interconnecting the grid and cathode of each of said first pair of balanced, cathode-coupled, direct current, triode amplifiers for substantially eliminating response to transients and ripple in the aforesaid proportional voltage parameters and voltage sample signals.

2. A system for measuring and controlling the power in an electrical network comprising in combination a first impedance means connected to the network for producing a first voltage proportional in amplitude and identical in phase to the current flowing in the network, a second impedance means connected to said first impedance means and to the network for producing a second voltage proportional in amplitude and identical in phase to the voltage across the network, a first amplifier connected to said first impedance means for response to said first voltage, a second amplifier connected to said second impedance means for response to said second voltage, means interconnecting the aforesaid first and second amplifiers for balancing same to produce equal output signals therefrom when the power in said electrical network is at a predetermined level, a voltage regulator means connected between the input to said first and second amplifiers and the point of interconnection of said first and second impedances for referencing said first and second voltages, a first relay having a solenoid and electrical contact means adapted to be actuated thereby when the power in said network deviates from said predetermined level in one direction, a second relay having a solenoid and electrical contact means adapted to be actuated thereby when the power in said network deviates from said predetermined level in the other direction, said first and second relay solenoids being connected to the outputs of said first and second amplifiers respectively, adjustable means disposed in said electrical network adapted to vary the power input thereto, and means connected between the appropriate contacts of said first and second relay contact means and said power input varying means for feeding back adjusting signals thereto in timely correspondence therewith, whereby said network power input is maintained at a substantially constant level during normal operation.

3. A system for measuring and controlling the power in an electrical network comprising in combination a first impedance means connected to the network for producing a first voltage proportional in amplitude and identical in phase to the current flowing in the network, a second impedance means connected to said first impedance means and to the network for producing a second voltage proportional in amplitude and identical in phase to the voltage across the network, a first amplifier connected to said first impedance means for response to said first voltage, a second amplifier connected to said second impedance means for response to said second voltage, means interconnecting the aforesaid first and second amplifiers for balancing same to produce equal output signals therefrom when the power in said electrical network is at a predetermined level, a voltage regulator means connected between the input to said first and second amplifiers and the point of interconnection of said first and second impedances for referencing said first and second voltages, a first relay having a solenoid and electrical contact means adapted to be actuated thereby when the power in said network deviates from said predetermined level in one direction, a second relay having a solenoid and electrical contact means adapted to be actuated thereby when the power in said network deviates from said predetermined level in the other direction, said first and second relay solenoids being connected to the outputs of said first and second amplifiers respectively, adjustable means disposed in said electrical network adapted to vary the power input thereto, and means connected between the appropriate contacts of said first and second relay contact means and said power input varying means for feeding back adjusting signals thereto in timely correspondence therewith, whereby said network power input is maintained at a substantially constant level and the power within said network is regulated according to the equation:

$$\text{Constant} \cong K_1 V_v (1 \pm X) + K_2 V_i (1 \mp X)$$

where $K_1$ and $K_2$ are circuit component constants, where $V_i$ is the aforementioned first voltage from said first impedance means, where $V_v$ is the aforesaid second voltage from said second impedance means, and where $X$ is the deviation of the voltage or current either above or below said predetermined level.

4. A system for measuring and controlling the power in an electrical network comprising in combination a first impedance means connected to the network for producing a first voltage proportional in amplitude and identical in phase to the current flowing in the network, a second impedance means connected to said first impedance means and to the network for producing a second voltage proportional in amplitude and identical in phase to the voltage across the network, a first amplifier connected to said first impedance means for response to said first voltage, a second amplifier connected to said second impedance means for response to said second voltage, means interconnecting the aforesaid first and second amplifiers for balancing same to produce equal output signals therefrom when the power in said electrical network is at a predetermined level, a voltage regulator means connected between the input to said first and second amplifiers and the point of interconnection of said first and second impedances for referencing said first and second voltages, a first relay having a solenoid and electrical contact means adapted to be actuated thereby when the power in said network deviates from said predetermined level in one direction, a second relay having a solenoid and electrical contact means adapted to be actuated thereby when the power in said network deviates from said predetermined level in the other direction, said first and second relay solenoids being connected to the outputs of said first and second amplifiers respectively, adjustable means disposed in said electrical network adapted to vary the power input thereto, and means connected between the appropriate contacts of said first and second relay contact means and said power input varying means for feeding back adjusting signals thereto in timely correspondence therewith, whereby the power input to said network is substantially maintained according to the equation:

$$\text{Constant} \cong [V_L (1 \pm X)][I_L (1 \mp X)]$$

where $V_L$ is the mean input voltage to said network, where $I_L$ is the mean input current to said network, and where X is the negative or positive deviation of the voltage or current to said network.

5. A system for measuring and controlling the power in an electrical network comprising in combination a first impedance means connected to the network for producing a first voltage proportional in amplitude and identical in phase to the current flowing in the network, a second impedance means connected to said first impedance means and to the network for producing a second voltage proportional in amplitude and identical in phase to the voltage across the network, a first amplifier connected to said first impedance means for response to said first voltage, a second amplifier connected to said second impedance means for response to said second voltage, means interconnecting the aforesaid first and second amplifiers for balancing same to produce equal output signals therefrom when the power in said electrical network is at a predetermined level, a voltage regulator means connected in parallel with each of said first and second impedances, a first relay having a solenoid and electrical contact means adapted to be actuated thereby when the power in said network deviates from said predetermined level in one direction, a second relay having a solenoid and electrical contact means adapted to be actuated thereby when the power in said network deviates from said predetermined level in the other direction, said first and second relay solenoids being connected to the outputs of said first and second amplifiers respectively, adjustable means disposed in said electrical network adapted to vary the power input thereto, and means connected between the appropriate contact of said first and second relay contact means and said power input varying means for feeding back adjusting signals thereto in timely correspondence therewith, whereby said network power input to a load is maintained at a substantially constant level during normal operation and decreases when the current and voltage applied thereto deviates beyond a safe useful range in either direction.

6. An electrical power level detector comprising in combination, an electrical network having a first impedance means for generating a first voltage that is a function of the current flowing in said network and a second impedance means connected to said first impedance means for generating a second voltage that is proportional to the voltage across said network, a first amplifier connected to said first impedance means for response to said first voltage, a second amplifier connected to said second impedance means for response to said second voltage, means interconnecting the aforesaid first and second amplifiers for balancing same for effecting production of equal output signals therefrom when the current in and voltage across said network are at predetermined levels, a voltage regulator tube connected between said first and second amplifiers and the point of interconnection of said first and second impedance means, and relay means effectively coupled to each of said amplifier means having sets of contacts respectively disposed for actuation by said output signals therefrom and adapted for effecting negative feedback adjustment of the aforesaid current and voltage in said electrical network when same deviates from said predetermined levels.

References Cited in the file of this patent
UNITED STATES PATENTS
2,907,403   Foley ------------------ Oct. 6, 1959